May 30, 1967  M. WOODS  3,323,051
METHOD AND APPARATUS FOR DETERMINING MOTION
CHARACTERISTICS OF A BODY
Filed Dec. 3, 1962
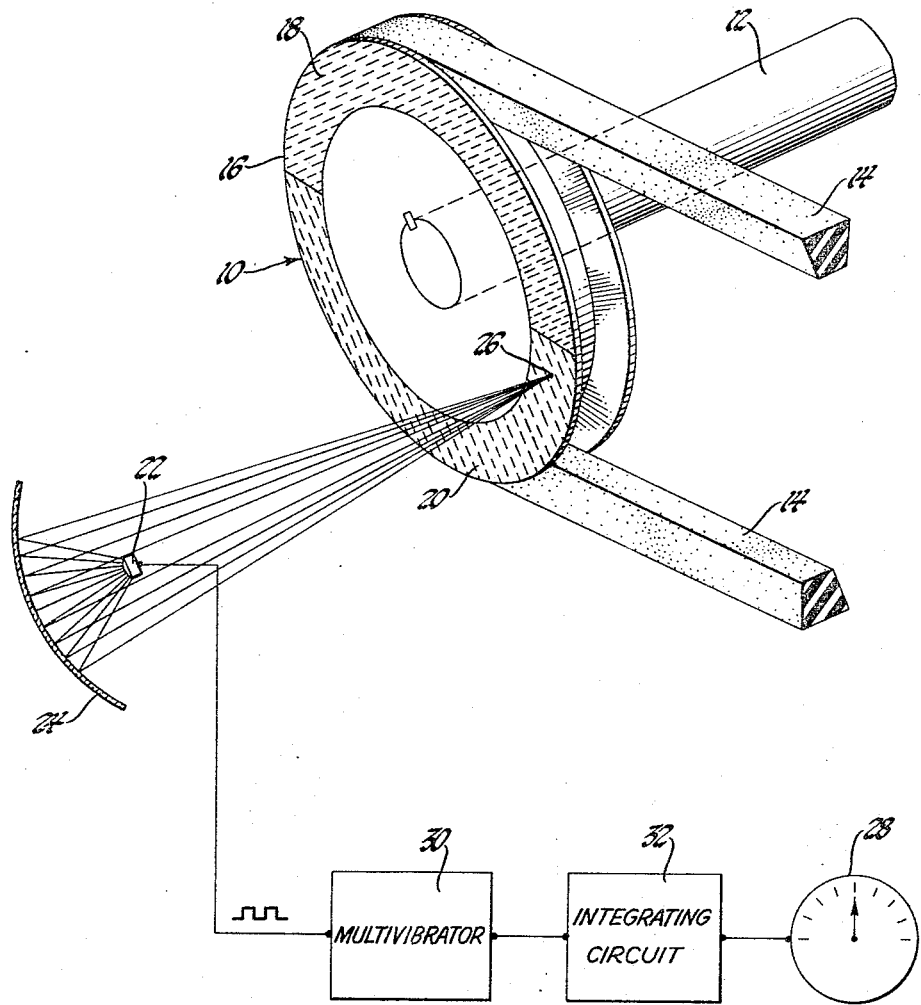
INVENTOR.
Martin Woods
BY
Hugh L. Fisher
ATTORNEY 3,323,051
METHOD AND APPARATUS FOR DETERMINING MOTION CHARACTERISTICS OF A BODY
Martin Woods, Warren, Mich., assignor to General Motors Corporation, Detroit, Mich., a corporation of Delaware
Filed Dec. 3, 1962, Ser. No. 241,677
10 Claims. (Cl. 324—70)

This invention relates to improved method and apparatus for determining the rate of cyclic motion of a body.

Frequently, it is necessary to determine the speed of a body at some location remote from the body. Mechanical apparatus, in addition to being difficut to operate away from the body, imposes a drag on a drive train. On the other hand, electronic tachometers, although suited for remote dispositions, are influenced by background effects and require a certain environment. For instance, a photoelectrically operated tachometer is bothered by backgrounds and cannot be used in the dark.

Accordingly, novel method and apparatus are proposed for accurately determining the rate of cyclic motion of a body without concern for background effects or environment.

More specifically, unique method and apparatus are contemplated for initially inducing and subsequently sensing changes in the emission of radiant energy in the infrared spectrum from a moving body. These changes are then converted into electrical energy having a characteristic reflecting the cyclic motion of the body and thereafter the characteristic is used to indicate the rate of the cyclic motion of the body.

The foregoing and other objects and advantages of the invention will become apparent from the description and the accompanying drawing in which the single figure shows a block diagram of a system incorporating the principles of the invention.

Referring now to the figure in detail, the numeral 10 denotes generally a rotating body, in this embodiment a pulley, whose angular velocity or rate of cyclic motion is to be determined. The pulley 10 is revolved by a drive shaft 12 and in turn transfers drive through a V-type belt 14 to some driven mechanism (not shown).

The pulley 10 has an angular rim 16 that has a dark portion 18 and a light portion 20. This contrast can be achieved in any suitable way, e.g., by painting the portions 18 and 20 respectively with appropriate gray and silver paint; preferably, for reasons to be explained, each portion 18 and 20 extends half of the distance around the rim 16 and therefore are equal. As is well known, if the pulley 10 has a temperature above absolute zero it will emit radiant energy in the infrared spectrum. Of course, if for some reason this temperature is not above absolute zero, artificial means (not shown) can be employed in any well known way to warm the pulley 10 the necessary amount. Consequently, by having alternately dark and light portions 18 and 20, there is a difference in the amount of radiant energy emitted from the rim 16. For instance, the dark portion 18 will emit three to four times more radiant energy than the light portion 20. This feature is utilized, as will become apparent, to facilitate the determination of the angular velocity of the pulley 10.

The emitted radiant energy from the rim 16 of the pulley 10 is detected by an infrared sensitive cell 22, which may be of any known type, for instance, a lead sulfide cell. To aid in the detection of the emitted radiant energy, a convex mirror 24 is so positioned relative to the pulley 10 as to focus on the rim 16 at a point 26. The mirror 24 then reflects some of the infrared radiation and concentrates it directly on the infrared sensitive cell 22.

By having the rim 16 half dark and half light, the changes in the amount of radiant energy emitted will cause the infrared sensitive cell 22 to develop a square wave shaped output having a frequency equal to the angular velocity or r.p.m. of the pulley 10. This square wave shaped output may in some instances be utilized to drive directly an r.p.m. indicating meter 28 of known construction and thus give a visual indication of the angular speed of the pulley 10. But, if prefered, the output from the cell 22 can be used to trigger a one-shot multivibrator 30 and thereafter the output from the one-shot multivibrator 30 can be integrated by an appropriate integrating circuit 32 so as to provide an output that is proportional to the angular velocity of the pulley 10. This integrated output can be used also to operate an r.p.m. meter of a character that would respond to the integrated output from the circuit 32.

The one-shot multivibrator 30 and the integrating circuit 32 or the equivalent would be essential if the output from the sensitive cell 22 was not a square wave. This would happen if the rim 16 was not half light and half dark or some other arrangement was made for cyclically varying the infrared radiation.

In operation, the pulley 10 is installed in a warm area so as to insure that the emitted radiant energy is in the infrared frequency spectrum. If this warm area is not available, then, as mentioned, heat will have to be provided artificially. With the pulley 10 rotating, the alternate dark and light portions 18 and 20 on the rim 16 will change the emission of radiant energy each half cycle or each half turn of the pulley 10. Consequently, the output from the infrared senitive cell 22 will have the indicated square wave shape and a frequency exactly equal to the r.p.m. of the pulley 10. The square wave shaped output triggers a one-shot multivibrator 30, the output of which is integrated by the circuit 32 to provide an integrated output that is proportional to the frequency at which the multivibrator 30 is triggered. Accordingly, the integrated output reflects the r.p.m. of the pulley 10. The r.p.m. meter 28 responds to this integrated output and is calibrated to visually indicate the actual speed of the pulley 10.

From the foregoing, it will be appreciated that by sensing the infrared radiation from the rotating pulley 10, there is no frictional drag induced into the drive train as would occur with a mechanical type tachometer. Moreover, the visual indication of the speed can be made at some position quite remote from the pulley 10, thus allowing the pulley to be in environments which would otherwise have to be avoided for various reasons, e.g., safety. Also, there is no concern for light since angular velocity can be checked in the dark.

The invention is to be limited only by the following claims.

What is claimed is:

1. The method of determining the rate of cyclic motion of a body comprising the steps of modifying a moving body so that portions thereof emit different amounts of radiant energy in the infrared spectrum, sensing at a position relative to the motion path of the body the different amounts of radiant energy emitted from the body during the motion thereof, converting the sensed radiant energy into an electrical output having a frequency component corresponding to the rate at which the body portions of different amounts of radiant energy move relative to the position, and measuring the electrical output so as to determine the rate of cyclic motion of the body.

2. The method described in claim 1 wherein the body is rotated and the component corresponds to the angular velocity of the rotating body.

3. The method described in claim 2 wherein the electrical output is a pulse train having a frequency corresponding to the angular velocity of the rotating body, and including the step of indicating the frequency of the pulse train.

4. The method described in claim 3 wherein the step of modifying the rotating body includes the altering of the surface of the rotating body so that one portion thereof is darker than another so as to emit an amount of radiant energy that is greater than the amount of radiant energy emitted by the lighter portion.

5. Apparatus for determining the angular velocity of a rotatable body comprising means causing the rotatable body to have portions thereof emit different amounts of radiant energy in the infrared spectrum, means positioned relative to the motion path of the body for sensing the different amounts of radiant energy emitted from the body as the portions thereof move relative thereto and developing an output having a frequency component corresponding to the rate at which the body portions of different amounts of radiant energy moves and accordingly to the angular velocity of the body, and means utilizing the output.

6. The apparatus described in claim 5 including means focusing the emitted radiant energy on the sensing means.

7. The apparatus described in claim 5 wherein the utilizing means in response to the output indicates the angular velocity of the body.

8. The apparatus described in claim 7 wherein the sensing means is an infrared sensing cell adapted to develop an electrical signal having a frequency component corresponding to the rate of change in the radiant energy sensed thereby and accordingly reflecting the angular velocity of the body.

9. The apparatus described in claim 5 wherein the causing means includes alternate dark and light portions arranged on the body so that more and less radiant energy is respectively emitted by the dark and light portions and the sensing means includes an infrared sensing cell fixedly positioned adjacent the body and adapted to develop an electrical signal having a frequency corresponding to the rate of change in the radiant energy sensed as the dark and light portions pass the cell and accordingly reflecting the angular velocity of the body.

10. The apparatus described in claim 9 further including means focusing the emitted radiant energy on the infrared sensing cell and wherein the sensing means further includes a trigger circuit operated by the output from the cell and integrating means combining with the trigger circuit to develop the electrical signal, and utilizing means in response to the electrical signal visually indicating the angular velocity.

References Cited

UNITED STATES PATENTS

| | | | |
|---|---|---|---|
| 2,683,813 | 7/1954 | Friedman | 250—71.5 |
| 3,097,299 | 7/1963 | Rasmussen | 250—83.3 |

OTHER REFERENCES

"Electronic Tachometer," Electronics Industries, March 1945, pp. 80, 81, and 208.

WALTER L. CARLSON, *Primary Examiner.*

FREDERICK M. STRADER, *Examiner.*

C. W. HOFFMAN, M. J. LYNCH, *Assistant Examiners.*